United States Patent
Therond et al.

(10) Patent No.: US 6,920,083 B2
(45) Date of Patent: Jul. 19, 2005

(54) METHOD INTENDED FOR DETECTION AND AUTOMATIC CLASSIFICATION, ACCORDING TO VARIOUS SELECTION CRITERIA, OF SEISMIC EVENTS IN AN UNDERGROUND FORMATION

(75) Inventors: Jean-François Therond, Neuilly sur Seine (FR); Jean-Pierre Deflandre, Ermont (FR); Christian Grouffal, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 289 days.

(21) Appl. No.: 10/262,966

(22) Filed: Oct. 3, 2002

(65) Prior Publication Data

US 2003/0067843 A1 Apr. 10, 2003

(30) Foreign Application Priority Data

Oct. 5, 2001 (FR) .......................................... 01 12893

(51) Int. Cl.⁷ ................................................ G01V 1/00
(52) U.S. Cl. .............................. 367/34; 367/26; 702/14; 702/15
(58) Field of Search .............................. 367/26, 34, 38, 367/47, 73; 702/14, 15, 59, 82; 340/690

(56) References Cited

U.S. PATENT DOCUMENTS

| | | | | |
|---|---|---|---|---|
| 3,824,532 A | * | 7/1974 | Vandierendonck | .......... 367/136 |
| 3,949,353 A | | 4/1976 | Waters et al. | |
| 4,227,198 A | * | 10/1980 | Preskitt et al. | ............. 346/33 C |
| 4,649,524 A | | 3/1987 | Vance | |
| 4,775,009 A | | 10/1988 | Wittrisch et al. | |
| 5,303,773 A | | 4/1994 | Czernichow et al. | |
| 5,373,486 A | * | 12/1994 | Dowla et al. | ................ 376/135 |
| 5,481,502 A | | 1/1996 | Cretin et al. | |
| 5,490,062 A | * | 2/1996 | Leach et al. | ................... 702/15 |
| 5,724,311 A | | 3/1998 | Laurent et al. | |
| 5,962,819 A | * | 10/1999 | Paulsson | ...................... 181/102 |
| 6,049,508 A | | 4/2000 | Deflandre | |
| 6,113,388 A | | 9/2000 | Martin et al. | |
| 6,205,087 B1 | * | 3/2001 | Fukuhara et al. | .............. 367/69 |

FOREIGN PATENT DOCUMENTS

| | | |
|---|---|---|
| EP | 0 546 892 B1 | 7/1996 |
| EP | 1 074 858 A1 | 2/2001 |
| FR | 2593282 | 7/1987 |
| FR | 2688898 | 9/1993 |
| FR | 2-703457 | 10/1994 |
| FR | 2 772 137 | 6/1999 |

* cited by examiner

*Primary Examiner*—Thomas H. Tarcza
*Assistant Examiner*—Scott A. Hughes
(74) *Attorney, Agent, or Firm*—Antonelli, Terry, Stout & Kraus, LLP

(57) ABSTRACT

A method for automatic classification, according to various selection criteria, of seismic or microseismic events picked up by seismic receivers coupled with an underground formation under development, according to whether the events are purely of microseismic nature or depend, on any account, on artifacts related to the outer environment or to formation development or monitoring activities, and for selection of the significant parts of traces for the purpose of analysis. The method has an application for monitoring of production or storage reservoirs under development.

42 Claims, 3 Drawing Sheets

METHOD INTENDED FOR DETECTION AND AUTOMATIC CLASSIFICATION, ACCORDING TO VARIOUS SELECTION CRITERIA, OF SEISMIC EVENTS IN AN UNDERGROUND FORMATION

BACKGROUND OF THE INVENTION

Field of the Invention

1. The present invention relates to a method of automatic classification, according to selection criteria, of records of seismic or microseismic events picked up by seismic receivers coupled with an underground formation under development.

2. Description of the Prior Art

Locating points of an underground zone, whether in a reservoir zone or in a cavity, in which occur microseismic events related to an activity which has the effect of modifying the stress field, is of great significance for the development of the zone, whether production of fluids extracted from a reservoir through one or more wells or injection of fluids into the zone.

It is for example possible to monitor the evolution of a hydrocarbon reservoir under development or of geothermal sites. In the case of enhanced recovery notably, it is desired to sweep the oil out of the rock by injecting fluids at pressures and temperatures that may be very different from those of the medium. The resulting stress variations may lead to a fracturation of the medium, which modifies the circulation of the fluids inside the reservoir and which it is important to locate properly.

It is also well-known to use underground reservoirs for fluid storage. The latter may be, for example, liquid or gas phase storage reservoirs wherein a certain microseismic activity induced by significant variations in the flow rate of the liquid or the gas taken from or injected into these reservoirs can be observed.

The reservoirs used may also be reservoir zones or cavities used for waste storage, which have to be monitored so as to respect the environment and to comply with the increasingly restricting pollution control regulations. An underground reservoir can be used to inject drilling fluids containing large amounts of solid particles since dumping these fluids after use on drilling sites is forbidden by regulations.

The temperature of the fluids injected is generally very different from the temperature of the medium at the depth where they are injected, which, in case of massive injection, has the effect of producing thermal stresses which generate fractures and therefore lead to a certain seismic activity. The injection pressure of these muds can also create stresses and lead to great changes in the medium.

The seismic activity induced by the effects of the pressure or of the temperature can reveal, for example, the formation of fractures or give rise to stresses in already existing fractures. They contribute to modifying the flow paths of the fluids in the medium, or they create escape paths for fluids out of the reservoir, containment breaks with possible pollution of the surrounding zones, notably of an aquifer used for drinkable water supply, which it is important to detect.

It is also of very great significance to monitor reservoirs used for storage of nuclear waste so as to prevent injection operations or local temperature rises due to storage from causing fractures in the layers providing containment.

With microseismic monitoring, also known as passive seismic, the developer's aim is, in the end, to interpret very quickly the data in connection with the conventional working data (pressure, flow rate, temperature, etc.) so as to be able to account for the mechanical response of the site in the development protocol in order to preserve the productivity of the well(s) or of the site. The microseismic activity observed can be combined with a mechanical degradation of the medium which can generate solids encroachment, with the opening of fractures likely to communicate the reservoir with an aquifer, or with other phenomena of thermo-poro-mechanical origin whose consequences may lead to a performance degradation of the wells or even to well damage.

U.S. Pat. Nos. 4,775,009 and 5,303,773 and EP 546,892 notably describe various techniques for monitoring the evolution over time of underground reservoirs, which comprise using seismic or other pickups permanently installed in one or more wells (embedded in the cement coupling the casing with the formation or externally combined with a production tubing and pressed against the inner face of the casing) without disturbing the various operations carried out (production, injection, various servicing operations performed by means of these wells). Permanent installation of pickups in wells allows seismic monitoring of a reservoir in order to detect different phenomena related to the development thereof.

French Patents 2,703,457 and 2,703,470 and U.S. Pat. No. 5,724,311 describe methods for long-term repetitive active monitoring of a reservoir through application of elastic waves to a formation and acquisition of the response signals sent back by the formation, by means of the permanent installation of emission and reception means in wells or close to the ground surface. Differential processing operations are carried out on acquisitions performed under identical conditions.

French Patent 2,688,896 and U.S. Pat. No. 5,481,502 notably describe electronic acquisition and transmission systems specially designed to collect signals from permanent pickups installed in wells outside casings or production tubings, and to transmit them to a surface recording and control equipment during long-term repetitive monitoring or seismic surveys.

Patent application EP-A-1,074,858 and U.S. Pat. No. 6,113,388 also describe a method for automatic analysis of signals acquired by one or more elastic or acoustic wave pickups so as to automatically locate thereon, with high accuracy, at least one significant time such as the time of first arrival on each pickup and/or the end of these signals.

U.S. Pat. No. 6,049,508 describes a method for automatic discrimination, from among all the events recorded, of those of type E which are of interest for characterization of the site, while taking into account the events induced at completion level, which are referred to as type C events. These events are generated by injection stops and resumptions, opening or closing of one of the completion elements (valve, packer, etc.) at any depth in the well or even at the surface (at the wellhead), including at surface installation level (pipes, various devices). Some of these actions, such as communication of the underground zone (reservoir) with the surface network, may lead, as a result of pressure variations notably, to type E events, often deferred, which it is desired to record and interpret. Type C events, which can be in very great number within a relatively short time interval (more than 3400 events in one week, by way of practical example), are detrimental to real-time monitoring of the geomechanical phenomena induced through the acquisition of type E events which are often in relatively small number for the same period (some ten events for example).

Besides the seismic receivers coupled with the formation, one or more reference pickups are used, which provide direct acoustic coupling with elements of the technical zone development equipment for detection of the elastic waves directly linked with the development. By means of a comparative analysis of the signals coming from these receivers and from each reference pickup, the records are sorted into different families according to whether the events in the underground zone are independent of the events detected by each reference pickup or depend on them directly or indirectly.

Systematic listening to microseismic events likely to occur in an underground formation generates, as mentioned above, a large amount of seismic records that have to be carefully classified so as to simplify later discrimination and analysis work.

SUMMARY OF THE INVENTION

The method according to the invention allows automatic classification, according to various criteria, of events detected on recorded seismic traces corresponding to signals picked up by seismic receivers coupled with an underground formation, according to whether the events are purely of microseismic nature or depend, on any account, on artifacts related to the outer environment or to formation development or monitoring activities, and selection of the significant parts of traces for the purpose of analysis.

The method according to the invention is notably applied for monitoring of reservoir zones generally used either to extract or to inject fluids therein.

The method comprises detecting, on at least one record trace during a detection window (PId) and according to at least one criterion, seismic signals which exceed a certain threshold (Sd) in relation to a determined selection function (E, A), selecting, at least on the trace, a total recording interval (PIe) overlapping into either side of detection interval (PId), and storing the signals of this recording interval (PIe) with a determined classification label, according to whether the signals detected therein correspond purely to a microseismic event or are related, to a certain extent, to artifacts.

According to an implementation mode, the method comprises applying a selection criterion including the detection of events on a single record trace (Tn) and storing corresponding global recording intervals on several traces.

According to another implementation mode, the method comprises applying a selection criterion including the detection of events on a certain number p ($p \geq 2$) of different record traces (Tn, Tp) if the corresponding detection intervals (PId) are included in a determined time interval (PIg), by applying the same selection function, and storing a global recording interval of sufficient duration to cover all the events, at least on said p traces.

According to another implementation mode, the method comprises applying a selection criterion including the detection of events on a certain number p ($p \geq 2$) of different record traces (Tn, Tp) if the corresponding detection intervals (PId) are included in a determined time interval (PIg), by applying the same selection function, and storing a global recording interval of sufficient duration to cover the events, on a number N of traces greater than number p.

According to another implementation mode, when one of the p traces is produced by acquisition of signals due to artifacts, the method comprises applying a cancellation criterion comprising the classification of the other traces where events are detected in the category of the cancelled traces, and storing them.

According to another implementation mode, the method comprises inhibiting the traces for which the detection time is longer than a determined time interval and revalidating them later if the value of the selection function is below a second threshold in a determined reactivation interval.

The seismic traces classified with the method are obtained by means of seismic or acoustic pickups coupled with the formations surrounding a well through the underground formation. They can correspond to signals reflected by the formation in response to the emission, in the ground, of signals emitted by a seismic source and, in this case, inhibition criteria are preferably used on several traces so as to select only seismic events that are not caused by the source.

The data processing device according to the invention allows automatic classification, according to different criteria, events detected on recorded seismic traces corresponding to signals picked up by seismic receivers coupled with an underground formation, according to whether the events are purely of microseismic nature or depend, on any account, on artifacts related to the outer environment or to formation development or monitoring activities, in order to select significant parts of traces for the purpose of analysis. The device comprises means for detecting, on at least one record trace during a detection window and according to at least one criterion, seismic signals which exceed a certain threshold in relation to a determined selection function, means for selecting at least on the trace a global recording interval overlapping into either side of the detection interval, and means for storing the signals of this recording interval with a determined classification label, according to whether the signals detected therein correspond purely to a microseismic event or are related, to a certain extent, to artifacts.

The system for seismic monitoring of an underground formation according to the invention comprises a plurality of seismic receivers coupled with the formation, a device for recording the signals picked up by the various seismic receivers and the processing device defined above.

The seismic receivers are, for example, hydrophones and/or geophones and/or accelerometers distributed in at least one well through the formation that can be coupled with the formation by means of a liquid or cement, mechanical coupling means or by magnetization.

The device can comprise at least one transmission cable connecting the seismic receivers to the recording device.

The data reception and/or transmission means use for example a technology based on optical fibers.

The device can include means for inhibiting record traces so as to select only seismic events that are not caused by the source or to prevent saturation of the recording device.

By means of detection and classification protocols, the method and the device allow isolatation, from among an often considerable amount of record files obtained through systematic listening to the microseismicity of a formation, a much more limited number of files containing directly interpretable, dated and classified significant records.

Unnecessary saturation of the data storage capacity is thus prevented and the effective autonomy of the seismic event processing device, whose capacity to work under stand-alone or independent conditions is a great asset, is increased.

The possibility of working with several modes simultaneously provides the processing device with certain advantages for the management of large sites where the zones monitored can undergo mechanical readjustments that are not necessarily perceptible from one zone to the next.

The possibility of temporarily and automatically inhibiting continuous detections on certain seismic receivers, used in combination with a mode of operation using several detection/inhibition modes, notably allows not losing any useful information that would be acquired through reception channels listened to only intermittently or through channels when meeting the reactivation criteria.

BRIEF DESCRIPTION OF THE DRAWINGS

Other features and advantages of the method according to the invention will be clear from reading the description hereafter of a non-limitative example, with reference to the accompanying drawings wherein.

DETAILED DESCRIPTION OF THE PREFERRED EMBODIMENTS OF THE INVENTION

Figure 1:
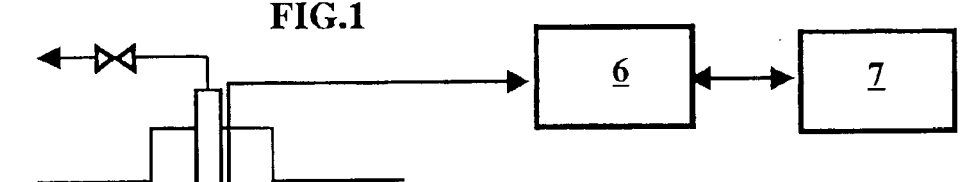
FIG. 1 diagrammatically shows a well equipped with receivers for seismic listening in a formation, FIG. 2 diagrammatically shows a method of fastening seismic receivers to a tubing.
Figure 2:
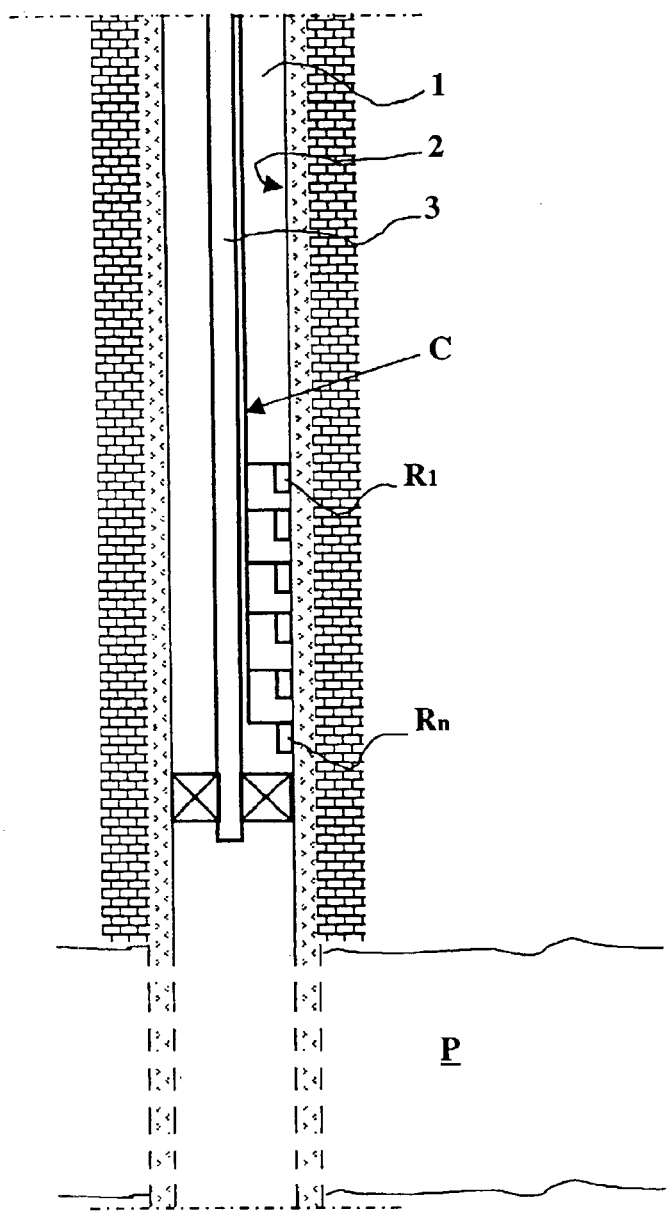
Figure 2:
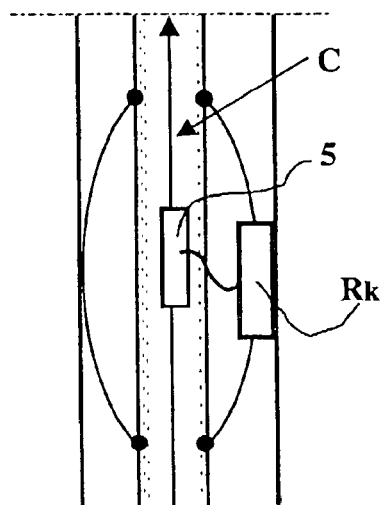

The seismic or microseismic monitoring system diagrammatically shown in FIG. 1 is installed in one or more wells 1 provided each with a casing pipe 2 which, once in place, is coupled with the surrounding formations by injecting cement between the pipe and the well. A production tubing 3 is lowered into the cased well. This tubing allows carrying out operations in an underground zone P (in order to extract fluids therefrom or to inject fluids therein). Pumps and valves (not shown) allow controlled activation of the zone considered. The seismic monitoring system comprises for example, in each well, a series of n seismic receivers R1 to Rn fastened to the exterior of the tubing and pressed against the inner wall of casing 2 by means of uncoupling devices such as flexible elements 4 (FIG. 2). It can also include receivers.

Each receiver Rk is for example a triphone comprising three geophones in a single box, whose axes are oriented in the directions of a trirectangular trihedron. Local electronic boxes 5 are arranged in the well. Each one is connected to one or more triphones Rk for acquisition of the signals picked up by the associated receivers. The various local electronic boxes are connected by one or more transmission cables C to a surface collection device 6 such as a microcomputer. In cases where receivers are permanently installed in several wells, at a distance from one another, the various collection devices 6 are for example connected to a distant central laboratory (not shown) by means of a communication network such as an Ethernet network for example, as described for example in the aforementioned French Patent 2,772,137 and U.S. Pat. No. 5,481,502. A multiwell multilevel telemetry system can comprise for example up to nine or eighteen levels of three traces per telemetric link installed in a well, and up to ten equipped wells.

In cases where a single telemetric link is used per well, a listening session can be launched from each surface assembly or from the central laboratory by means of an activation signal. Once a day or on the operator's initiative, listening is interrupted and a series of tests is carried out according to the protocol described hereafter in order to locate, on the records, the notable seismic events that have occurred during the listening session, to classify them and to record them in the journal, after which listening is restarted.

Listening Configuration

This action allows selection from the site equipment configuration, the listening configuration, i.e. all of the record traces (referred to as "listening" traces) that will be part of the listening session.

This step being completed, the operator can define the acquisition configuration.

Definition of the Detection Criteria

This operation allows the operator to define the detection criteria relative to the microseismic events and all of the listening traces on which they will be applied. A certain number of traces therefore has to be defined among the listening traces:

the "detecting" traces on which the criteria are applied;
 the traces to be recorded, which will be recorded on each criterion; and
 the cancellation traces that will allow confirmation or invalidation of the fact that an event detected on one or more detecting traces is a microseismic event.

If a microseismic event is detected, all the digitized signals on all the traces to be recorded at times that define the event are dated and stored on the disk of the acquisition microcomputer. The journal is also updated.

By definition, a criterion is an analysis function to be applied on one or more traces within a given period of time.

It is for example an "energy" function $E(T_n, P_{Id}, S_d)$. This function calculates the rms value of the signal of trace $T_n$ in a interval $P_{Id}$ and compares the result with a threshold $S_d$. If the threshold value is exceeded, the function returns the Boolean TRUE; in the opposite case, it returns FALSE. The rms value is calculated by taking away from each sample the continuous component calculated in interval $P_{Id}$.

It can also be an "amplitude" function $A(T_n, P_{Id}, S_d, X)$. This function calculates the absolute value of the signal of trace $T_n$ in a interval $P_{Id}$ and compares the number of times threshold $S_d$ is exceeded in relation to number X used as a parameter. If the threshold is exceeded, the function returns the Boolean TRUE; in the opposite case, it returns FALSE.

Listed hereunder are a number of event detection criteria, then event cancellation criteria and finally a procedure allowing a noisy detecting trace to be inhibited.

Recording Limits

In order to prevent saturation of the storage disk, it may be decided for example to record only 50% of the events over a period of one hour and 10% over one day. This limitation can be removed for certain operations such as listening during fracturation. During permanent listening, all the events are automatically backed up at regular intervals (every 24 hours for example on an optical disk). This backup procedure can also be performed at the operator's request.

Various Detection Criteria

Figure 3:
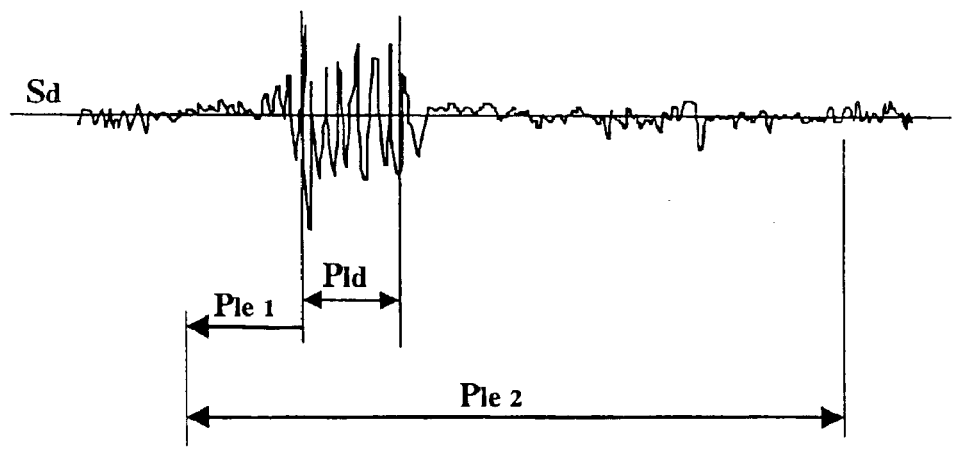
FIG. 3 illustrates the criterion applied to the detection of a single trace.
Figure 4:
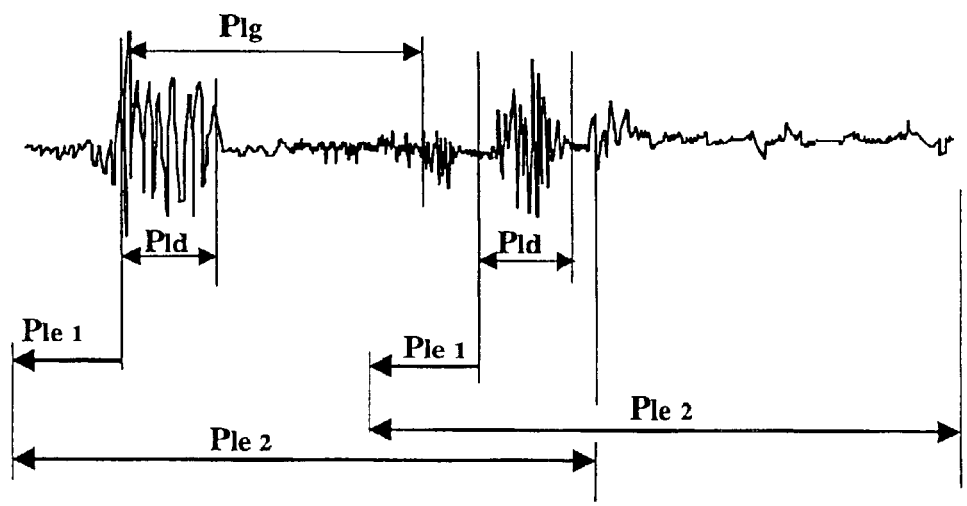
FIG. 4 illustrates a variant of this criterion allowing to separate the successive events.

Principle of the Criteria Applied to a Single Trace Tn (FIGS. 3, 4)

This criterion allows detecting that an event is a microseismic event. For a trace $T_n$, the criterion can be formulated as follows: a detected event becomes microseismic if the result of the function applied to interval $P_{Id}$ (detection interval) exceeds threshold $S_d$. The detected event causes recording of all the traces to be recorded associated with this criterion. This recording procedure starts on the samples acquired from the start of interval $P_{Id}$ minus an interval PIe1 (front recording interval) and involves an interval PIe2 (total recording interval). For detection of the threshold, interval PId progresses each time by a half-interval.

If a new detection occurs before the end of an interval PIg (total event interval), it is considered that it is the same microseismic event. On the other hand, any new detection beyond PIg is considered to be another microseismic event and it is recorded.

Figure 5:
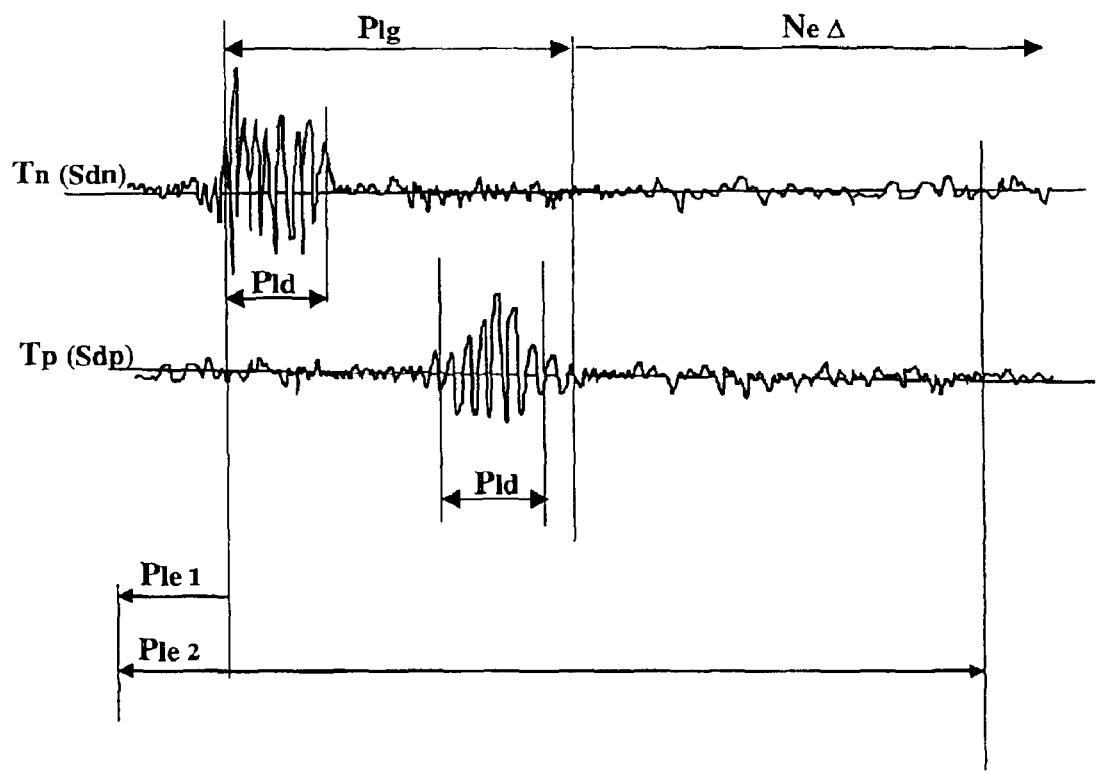
FIG. 5 illustrates the criterion applied to the detection applied to several traces.
Figure 6:
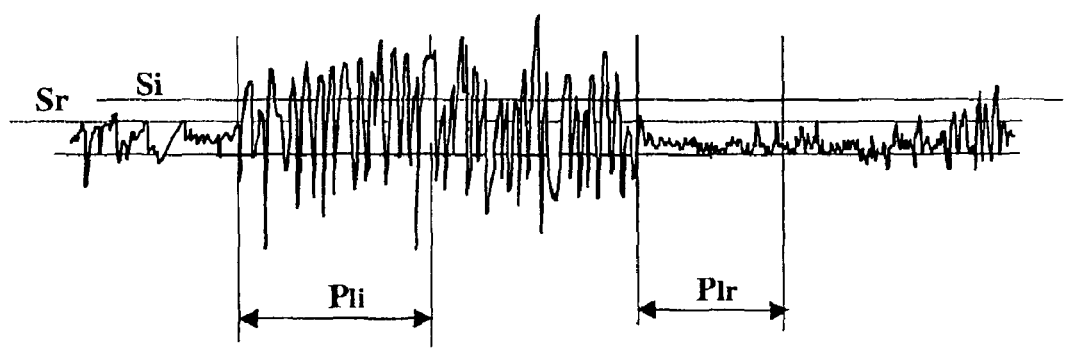
FIG. 6 illustrates the trace inhibition and reactivation criterion allowing to reject too noisy traces.

All the recorded traces have a size PIe ranging from several ten milliseconds up to one or more seconds for example. In the above-mentioned case, the records overlap.
Principle of the Multitrace Detection Criterion (FIG. 5)

This type of criterion allows to confirm more finely that an event is actually microseismic. The traces on which these criteria are applied are obtained in a single well or in different wells. For two traces Tn and Tp, the criterion can be formulated as follows:

The detected event becomes microseismic if, in a total event interval PIg, the rms value of Tn in an interval PId exceeds threshold Sdn and the rms value of Tp in an interval PId exceeds threshold Sdp. The detected event causes recording of all the traces to be recorded associated with this criterion. This recording procedure starts on the samples acquired at the beginning of interval PIdn minus an interval PIe1 and involves the total recording interval PIe2.

If the criterion is again met before the end of interval PIg, it is considered to be the same microseismic event. On the other hand, any new detection beyond PIg is considered to be another microseismic event Nes and it is recorded.

This criterion can concern more than two traces, and validation can occur either:

if N detecting traces meet the criterion in a total interval PIg, or if N traces among the detecting traces at least meet the criterion in a total interval PIg.

Criterion Types and Parameterization
Parameterization by Traces

For each detecting trace, the following parameters are defined:

the function to be applied, E or A,
the detection threshold Sd,
the inhibition threshold Si,
the trace reactivation threshold Sr,
the exceeding number X (if the function selected is "amplitude").

Criterion Relative to N Specific Detecting Traces (Criterion Ca)

This type of criterion is met if the result of all the functions performed on all the detecting traces specified returns the Boolean TRUE in a given time interval, which amounts to an AND logic operation between all the function results.

The following parameters are required to parametrize this criterion (Ca):

list of the detecting traces related to this criterion,
detection limit interval (PIg),
detection calculation interval (PId),
list of the record traces related to this criterion,
front recording interval (PIe1), and
total recording time (PIe2).

During a listening session, the operator can define several type Ca criteria with different parameters (Ca1, Ca2, etc.).
Criterion Relative to N Detecting Traces Among P (Criterion Cb)

This type of criterion is met if the result of at least N functions carried out on all the detecting traces specified returns the Boolean TRUE in a given time interval.

The following parameters are required to parametrize this criterion (Cb):

list of the detecting traces related to this criterion,
number of traces that must meet the criterion,
list of the record traces related to this criterion,
detection limit interval (PIg),
detection calculation interval (PId),
front recording interval (PIe1), and
total recording time (PIe2).

During a listening session, the operator can define several type Cb criteria with different parameters (Cb1, Cb2, etc.).
Criterion Relative to a Single Detecting Trace (Criterion Cc)

This criterion is met if the result of the function carried out on one of the specified traces returns the Boolean TRUE, which amounts to an OR logic operation between all the results of the functions associated with the traces.

The following parameters are required to parametrize this criterion(Cc):

number of the detecting trace(s),
detection limit interval (PIg),
detection calculation interval (PId).
list of the record traces related to this criterion,
front recording interval (PIe1), and
total recording time (PIe2).

During a listening session, the operator can define several type Cc criteria with different parameters (Cc1, Cc2, etc.). The operator can also give a list of detecting traces using the same parameters.
Event Cancellation Criterion (Cs)

When a detection criterion is being defined, a certain number of traces is selected to be cancellation traces. These traces are generally the surface traces or the tubing traces. In case of cancellation of the detection criterion, only the cancellation traces will be recorded. This cancellation criterion is used to detect a surface noise caused by work in progress.

The following parameters are required to parametrize this criterion (Cs):

number of the surface trace (Ts) or of the tubing trace (Tb),
detection calculation interval (PIad),
front cancellation interval (PIa1) (positive or negative value),
total cancellation interval (PIa2),
front recording interval (PIea1), and
total recording time interval (PIea2).

If the cancellation criterion is triggered, detection of the associated criterion is cancelled during total recording time interval PIea2.

This criterion allows inactivating a noisy detecting trace.

In any case, if an event detection on a detecting trace extends over an interval greater than PIi (inhibition interval), this trace is no longer taken into account in the detection criteria. It will be validated again if its rms value remains below the reactivation threshold (Sr) during an interval PIr (reactivation interval). This principle allows elimination of the non-seismic events or even continuous seismic events resulting from the temporary use of a seismic source for another purpose, such as an isolated seismic acquisition or acquisitions of the same type carried out regularly.

An inhibited trace is removed from the list of the detecting traces. If it was part of a type Ca (AND) criterion, its triggering will still be considered as TRUE.

Example for a detecting trace:
If the natural noise level is $2\mu$ Veff, the following may be chosen:
- a 100-ms detection interval (PId),
- a $4\mu$ Veff detection threshold (Si),
- a 2-second inhibition interval (PIi),
- a 2-second reactivation interval (PIr),
- a $3\mu$ Veff reactivation threshold to reactivate the trace in the criterion (Sr).

The following parameters are required to parametrize this criterion (Ci):
- number of traces subjected to this principle,
- inhibition interval (PIi),
- reaction interval (PIr).

The inhibition and reactivation thresholds are the thresholds Si and Sr of each detecting trace.

The method has been described in applications to seismic or microseismic data processing. It is clear that it can be applied more generally for processing any signal of undulatory or acoustic nature.

What is claimed is:

1. A method for automatic classification, according to criteria, of events detected on recorded traces corresponding to seismic or acoustic signals picked up by receivers coupled with an underground formation, according to whether the events are of a seismic or microseismic nature or depend on artifacts related to environment, formation development or monitoring activities, and for selection of parts of the recorded traces for analysis comprising: detecting events comprising seismic signals on at least one recorded trace during a detection interval according to at least one criterion, which exceed a threshold in relation to a selection function, selecting at least on the at least one recorded trace a total recording interval overlapping into either side of the detection interval, and storing signals in the total recording interval with a classification according to whether the signals detected therein correspond to a seismic event microseismic event, or are related to artifacts.

2. A method as claimed in claim 1, comprising:
applying the selection criterion comprising detecting the events on a single record trace and storing corresponding total recording intervals on traces.

3. A method as claimed in claim 1, comprising:
applying a selection criterion comprising detecting the events on a number $p \geq 2$ of different recorded traces if corresponding detection intervals are included in a time interval, by applying the selection function, and storing the total recording interval of a duration sufficient to cover the events, at least for the p traces.

4. A method as claimed in claim 1, comprising:
applying a selection criterion comprising detecting the events over a number $p \geq 2$ of different record traces if corresponding detection intervals are included in a time interval, by applying the selection function, and storing the total recording interval of a duration sufficient to cover the events, for a number of traces greater than the number p.

5. A method as claimed in claim 3, wherein:
one of the p traces is produced by acquisition of signals due to artifacts and a cancellation criterion of the artifacts is applied comprising classifying other traces where the events are detected in the category of the cancelled traces and storing cancelled traces.

6. A method as claimed in claim 1, comprising:
inhibiting traces for which a detection time is greater than a determined time interval and thereafter revalidating the inhibited traces if a value of the selection function is below a second threshold in a determined reactivation interval.

7. A method as claimed in claim 2, comprising:
inhibiting traces for which a detection time is greater than a determined time interval and thereafter revalidating the inhibited traces if a value of the selection function is below a second threshold in a determined reactivation interval.

8. A method as claimed in claim 3, comprising:
inhibiting traces for which a detection time is greater than a determined time interval and thereafter revalidating the inhibited traces if a value of the selection function is below a second threshold in a determined reactivation interval.

9. A method as claimed in claim 4, comprising:
inhibiting traces for which a detection time is greater than a determined time interval and thereafter revalidating the inhibited traces if a value of the selection function is below a second threshold in a determined reactivation interval.

10. A method as claimed in claim 5, comprising:
inhibiting traces for which a detection time is greater than a determined time interval and thereafter revalidating the inhibited traces if a value of the selection function is below a second threshold in a determined reactivation interval.

11. A method as claimed in claim 1, wherein:
the seismic traces are obtained by seismic or acoustic pickups coupled with formations surrounding a well.

12. A method as claimed in claim 2, wherein:
the seismic traces are obtained by seismic or acoustic pickups coupled with formations surrounding a well.

13. A method as claimed in claim 3, wherein:
the seismic traces are obtained by seismic or acoustic pickups coupled with formations surrounding a well.

14. A method as claimed in claim 4, wherein:
the seismic traces are obtained by seismic or acoustic pickups coupled with formations surrounding a well.

15. A method as claimed in claim 5, wherein:
the seismic traces are obtained by seismic or acoustic pickups coupled with formations surrounding a well.

16. A method as claimed in claim 1, wherein:
the selection criteria are selected from among criteria of a criteria library.

17. A method as claimed in claim 2, wherein:
the selection criteria are selected from among criteria of a criteria library.

18. A method as claimed in claim 3, wherein:
the selection criteria are selected from among criteria of a criteria library.

19. A method as claimed in claim 4, wherein:
the selection criteria are selected from among criteria of a criteria library.

20. A method as claimed in claim 5, wherein:
the selection criteria are selected from among criteria of a criteria library.

21. A method as claimed in claim 6, wherein:
the selection criteria are selected from among criteria of a criteria library.

22. A method as claimed in claim 11, wherein:
the selection criteria are selected from among criteria of a criteria library.

23. A method as claimed in claim 1, wherein:
the recorded traces are signals sent back by the formation in response to an emission in the ground of signals emitted by a seismic source, and inhibition criteria are used on the traces so as to select only seismic events that are not caused by the source.

24. A method as claimed in claim 2, wherein:
the recorded traces are signals sent back by the formation in response to an emission in the ground of signals emitted by a seismic source, and inhibition criteria are used on the traces so as to select only seismic events that are not caused by the source.

25. A method as claimed in claim 3, wherein:
the recorded traces are signals sent back by the formation in response to an emission in the ground of signals emitted by a seismic source, and inhibition criteria are used on the traces so as to select only seismic events that are not caused by the source.

26. A method as claimed in claim 4, wherein:
the recorded traces are signals sent back by the formation in response to an emission in the ground of signals emitted by a seismic source, and inhibition criteria are used on the traces so as to select only seismic events that are not caused by the source.

27. A method as claimed in claim 5, wherein:
the recorded traces are signals sent back by the formation in response to an emission in the ground of signals emitted by a seismic source, and inhibition criteria are used on the traces so as to select only seismic events that are not caused by the source.

28. A method as claimed in claim 6, wherein:
the recorded traces are signals sent back by the formation in response to an emission in the ground of signals emitted by a seismic source, and inhibition criteria are used on the traces so as to select only seismic events that are not caused by the source.

29. A method as claimed in claim 11, wherein:
the recorded traces are signals sent back by the formation in response to an emission in the ground of signals emitted by a seismic source, and inhibition criteria are used on the traces so as to select only seismic events that are not caused by the source.

30. A method as claimed in claim 16, wherein:
the recorded traces are signals sent back by the formation in response to an emission in the ground of signals emitted by a seismic source, and inhibition criteria are used on the traces so as to select only seismic events that are not caused by the source.

31. A data processing device for automatic classification, according to criteria, of events detected on recorded seismic traces corresponding to signals picked up by seismic receivers coupled with an underground formation, according to whether the events are microseismic events or depend, on artifacts related to an environment, formation development or monitoring activities, and for selection of parts of the recorded traces for a purpose of analysis, comprising means for detecting events comprising seismic signals on at least one recorded trace in a detection interval and according to at least one criterion, which exceed a threshold in relation to a determined selection function, means for selecting, at least on the at least one recorded trace a total recording interval overlapping into either side of the detection interval, and means for storing signals of the total recording interval with a classification, according to whether the signals detected therein correspond to a microseismic event or are related to artifacts.

32. A device for seismic monitoring of an underground formation, comprising:
a plurality of seismic receivers coupled with the formation, a recording device for recording signals picked up by the seismic receivers and a device for processing recorded signals so as to automatically classify, according to criteria, events detected in the recorded seismic traces corresponding to signals picked up by the seismic receivers coupled with an underground formation, according to whether the events are a seismic event, a microseismic event or depend, on artifacts related to environment, formation development or monitoring activities, and selection of parts of the recorded traces for analysis, means for detecting, in at least one recorded trace in a detection interval and according to at least one criterion, seismic signals that exceed a threshold in relation to a selection function, means for selecting, at least in the at least one recorded trace, a total recording interval overlapping into either side of the detection interval, and means for storing signals in the recording interval with a classification, according to whether signals therein correspond to a seismic event, microseismic event or are related to artifacts.

33. A device as claimed in claim 31, wherein:
the seismic receivers are at least one of hydrophones, geophones or accelerometers distributed in at least one well through the formation.

34. A device as claimed in claim 32, wherein:
the seismic receivers are coupled with the formation by at least one of a liquid, cement, a mechanical coupling or by magnetization.

35. A device as claimed in claim 32, comprising:
at least one transmission cable connecting the seismic receivers to the recording device.

36. A device as claimed in claim 34, comprising:
at least one transmission cable connecting the seismic receivers to the recording device.

37. A device as claimed in claim 32, comprising:
at least one of a data reception and transmission means including optical fibers.

38. A device as claimed in claim 33, comprising:
at least one of a data reception and transmission means including optical fibers.

39. A device as claimed in claim 34, comprising:
at least one of a data reception and transmission means including optical fibers.

40. A device as claimed in claim 35, comprising:
at least one of a data reception and transmission means including optical fibers.

41. A device as claimed in claim 31, comprising:
means for inhibiting recorded traces to select only seismic events not caused by the source.

42. A device as claimed in claim 31, comprising:
means for preventing saturation of the device or recording.

* * * * *